US011923638B2

(12) United States Patent
Morgan et al.

(10) Patent No.: US 11,923,638 B2
(45) Date of Patent: Mar. 5, 2024

(54) CIRCUIT BOARD ASSEMBLY FOR A COMMUNICATION SYSTEM

(71) Applicant: TE Connectivity Services GmbH, Schaffhausen (CH)

(72) Inventors: Chad William Morgan, Carney's Point, NJ (US); John Joseph Consoli, Harrisburg, PA (US); Timothy Robert Minnick, Enola, PA (US); Justin Dennis Pickel, Hummelstown, PA (US); David Allison Trout, Lancaster, PA (US); Michael Streckewald, Harrisburg, PA (US); Douglas Edward Shirk, Elizabethtown, PA (US)

(73) Assignee: TE CONNECTIVITY SOLUTIONS GMBH, Schaffhausen (CH)

( * ) Notice: Subject to any disclaimer, the term of this patent is extended or adjusted under 35 U.S.C. 154(b) by 221 days.

(21) Appl. No.: 17/516,859

(22) Filed: Nov. 2, 2021

(65) Prior Publication Data

US 2023/0138913 A1 May 4, 2023

(51) Int. Cl.

| | |
|---|---|
| ***H01R 13/631*** | (2006.01) |
| ***H01R 12/70*** | (2011.01) |
| ***H01R 12/72*** | (2011.01) |
| ***H01R 12/75*** | (2011.01) |
| ***H01R 24/20*** | (2011.01) |
| ***H01R 24/28*** | (2011.01) |
| *H01R 107/00* | (2006.01) |

(52) U.S. Cl.

CPC ..... *H01R 13/6315* (2013.01); *H01R 12/7047* (2013.01); *H01R 12/727* (2013.01); *H01R 12/75* (2013.01); *H01R 24/20* (2013.01); *H01R 24/28* (2013.01); *H01R 2107/00* (2013.01)

(58) Field of Classification Search

CPC .... H01R 2107/00; H01R 24/20; H01R 24/28; H01R 12/727; H01R 12/75; H01R 12/737; H01R 12/91; H01R 12/722; H01R 12/7047; H01R 12/7052; H01R 13/6315

USPC ........................................ 439/362, 247, 246

See application file for complete search history.

(56) References Cited

U.S. PATENT DOCUMENTS

| | | | | | |
|---|---|---|---|---|---|
| 3,651,444 | A * | 3/1972 | Desso | H01R 13/4538 | 439/680 |
| 4,906,197 | A * | 3/1990 | Noll | H01R 13/631 | 439/364 |
| 5,271,286 | A * | 12/1993 | Vranish | H01R 43/26 | 244/173.1 |
| 5,383,790 | A * | 1/1995 | Kerek | H01R 13/635 | 439/248 |

(Continued)

*Primary Examiner* — Marcus E Harcum

(57) ABSTRACT

A circuit board assembly includes an electrical connector mounted to a circuit board having a connector housing holding contacts in a contact array. A connector mount having a bracket is coupled to the mounting surface of the circuit board proximate to the mating edge. The electrical connector is movably coupled to the connector mount to move relative to the circuit board during mating with the mating electrical connector. The connector mount has a biasing member compressible along a compression axis parallel to the mating direction to allow the electrical connector to float in the mating direction relative to the circuit board. The electrical connector is movably coupled to the connector mount in a confined envelope in at least one floating direction perpendicular to the mating direction.

23 Claims, 8 Drawing Sheets

(56) References Cited

U.S. PATENT DOCUMENTS 6,261,122 B1 * 7/2001 Richter .............. H01R 13/6315 439/477
6,364,536 B1 * 4/2002 Chen .................. H01R 13/6315 439/246
6,422,885 B2 * 7/2002 Kain .................. H01R 13/6315 439/247
6,851,980 B2 * 2/2005 Nelson ................... H01R 12/00 439/246
7,168,978 B1 * 1/2007 Trout ................... H01R 13/743 439/545
7,393,228 B2 * 7/2008 Kabasawa ............... F04D 19/04 439/247
7,549,885 B1 * 6/2009 Oh ..................... H01R 13/6215 439/316
7,704,077 B1 * 4/2010 Morley .................. H01R 24/50 439/63
8,231,399 B2 * 7/2012 Daubigney ........ H01R 13/6275 439/316
8,366,468 B2 * 2/2013 Carnevali ............. G06F 1/1632 439/384
8,894,431 B2 * 11/2014 Tiberghien ......... H01R 13/6315 439/247
9,270,052 B1 * 2/2016 Martin ............... H01R 13/6315
9,614,311 B2 * 4/2017 Duenkel ................ H01R 13/05
9,730,357 B2 * 8/2017 Simpson .............. H05K 7/1492
9,843,140 B1 * 12/2017 Rossman ............... H01R 12/91
10,103,462 B1 * 10/2018 Herring ................ H01R 12/737
10,177,483 B1 * 1/2019 Horning ............. H01R 13/6473
10,224,652 B2 * 3/2019 Herring ................ H01R 12/737
10,297,963 B2 * 5/2019 Herring .................. H01R 27/02
10,320,134 B2 * 6/2019 Blackburn ......... H01R 13/6587
10,558,000 B2 * 2/2020 Miller .................. G02B 6/3817
10,811,798 B2 * 10/2020 Rossman ............... H01R 12/91
2001/0002344 A1 * 5/2001 Yokoi .................. H01R 13/748 439/246
2002/0001985 A1 * 1/2002 Saito ................ H01R 13/62905 439/246
2003/0077932 A1 * 4/2003 Lewinnek .......... H01R 13/6315 439/246
2004/0180568 A1 * 9/2004 Wu .................... H01R 13/6215 439/362
2006/0105603 A1 * 5/2006 Nishio ............... H01R 13/6315 439/247
2006/0141836 A1 * 6/2006 Van Der Mee .... H01R 13/6315 439/247
2008/0026622 A1 * 1/2008 Tomizu .............. H01R 13/6315 439/247
2009/0068870 A1 * 3/2009 Mezhinsky .......... G02B 6/3897 439/247
2015/0071675 A1 * 3/2015 Suzaki ................... G03G 15/80 439/247
2017/0257980 A1 * 9/2017 Fukunaga ............... F16L 37/40

* cited by examiner

CIRCUIT BOARD ASSEMBLY FOR A COMMUNICATION SYSTEM

BACKGROUND OF THE INVENTION

The subject matter herein relates generally to communication systems.

Communication systems use electrical connectors to electrically connect various components to allow data communication between the components. For example, in a backplane system, circuit board assemblies having electrical connectors mounted to circuit boards are mated to electrically connect the circuit boards. Alignment of the electrical connectors during mating is difficult and misalignment may lead to damage of components of the electrical connectors. The system may include an equipment rack used to support the circuit board assemblies relative to each other. Known rack mount circuit board backplane connectors typically need to absorb large dimensional tolerance accumulation of the relative distance between the circuit boards inserted from both sides of the equipment rack. Typical tolerance distances may be 1.5 mm or more. The contacts of the backplane connectors at the mating zone are sized to accommodate the circuit board mating tolerance distances. For example, the lengths of the contacts include the lengths required for mechanical mating and any designed contact wipe length plus the additional circuit board mating tolerance distance. The contacts have such length to accommodate the possible range of circuit board mating conditions. The additional length of the contacts is typically provided as an extension of the stub of the contact, which is the portion of the contact that extends past the mating point, to ensure that the contacts remain mated regardless of the circuit board positions. In high speed connectors, the stubs can significantly degrade the signal integrity performance of the connector. The electrical stub acts as a reflective element for energy that travels along the stub. When the energy travels back at certain combinations of signal wavelength (for example, frequency) and physical stub length, the stub can generate a null in transmitted energy at a specific frequency. When the stub is long enough, and the respective frequency low enough, the null is detrimental to the transmitted energy of the signal that reaches the receiver.

A need remains for electrical connectors of a communication system having an improved mating interface.

BRIEF DESCRIPTION OF THE INVENTION

In one embodiment, a circuit board assembly is provided and includes a circuit board having a mounting surface. The circuit board has a mating edge. A circuit board assembly is provided and includes an electrical connector having a connector housing holding contacts in a contact array. The connector housing has a mating end and a cable end. The mating end is configured to be mated with a mating electrical connector in a mating direction. The electrical connector has cables terminated to the contacts and extends from the cable end. The connector housing has a mounting feature. A circuit board assembly is provided and includes a connector mount for locating the electrical connector relative to the circuit board. The connector mount has a bracket coupled to the mounting surface of the circuit board proximate to the mating edge. The electrical connector is movably coupled to the connector mount to move relative to the circuit board during mating with the mating electrical connector. The connector mount has a biasing member that is coupled to the bracket and coupled to the mounting feature of the electrical connector. The biasing member is compressible along a compression axis parallel to the mating direction to allow the electrical connector to float in the mating direction relative to the circuit board, wherein the electrical connector is movably coupled to the connector mount in a confined envelope in at least one floating direction perpendicular to the mating direction.

In another embodiment, a communication system is provided and includes a first circuit board assembly including a first circuit board, a first connector mount coupled to the first circuit board, and a first electrical connector coupled to the first connector mount. The first electrical connector has a first connector housing holding first contacts in a contact array. The first connector housing has a mating end and a cable end. The first electrical connector has cables terminated to the first contacts and extends from the cable end. The first connector housing has a first mounting feature. The first connector mount has a first bracket coupled to a mounting surface of the first circuit board proximate to the mating edge. The first electrical connector is movably coupled to the first connector mount to move relative to the first circuit board in a mating direction. The first connector mount has a first biasing member coupled to the first bracket and coupled to the first mounting feature of the first electrical connector. The first biasing member is compressible along a compression axis parallel to the mating direction to allow the first electrical connector to float in the mating direction relative to the first circuit board, wherein the first electrical connector is movably coupled to the first connector mount in a confined envelope in at least one floating direction perpendicular to the mating direction. A circuit board assembly is provided and includes a second circuit board assembly including a second circuit board and a second electrical connector coupled to the second circuit board. The second electrical connector has a second connector housing that holds second contacts in a contact array. The second connector housing has a mating end coupled to the mating end of the first connector housing along a mating axis parallel to the mating direction.

DETAILED DESCRIPTION OF THE INVENTION

Figure 1:
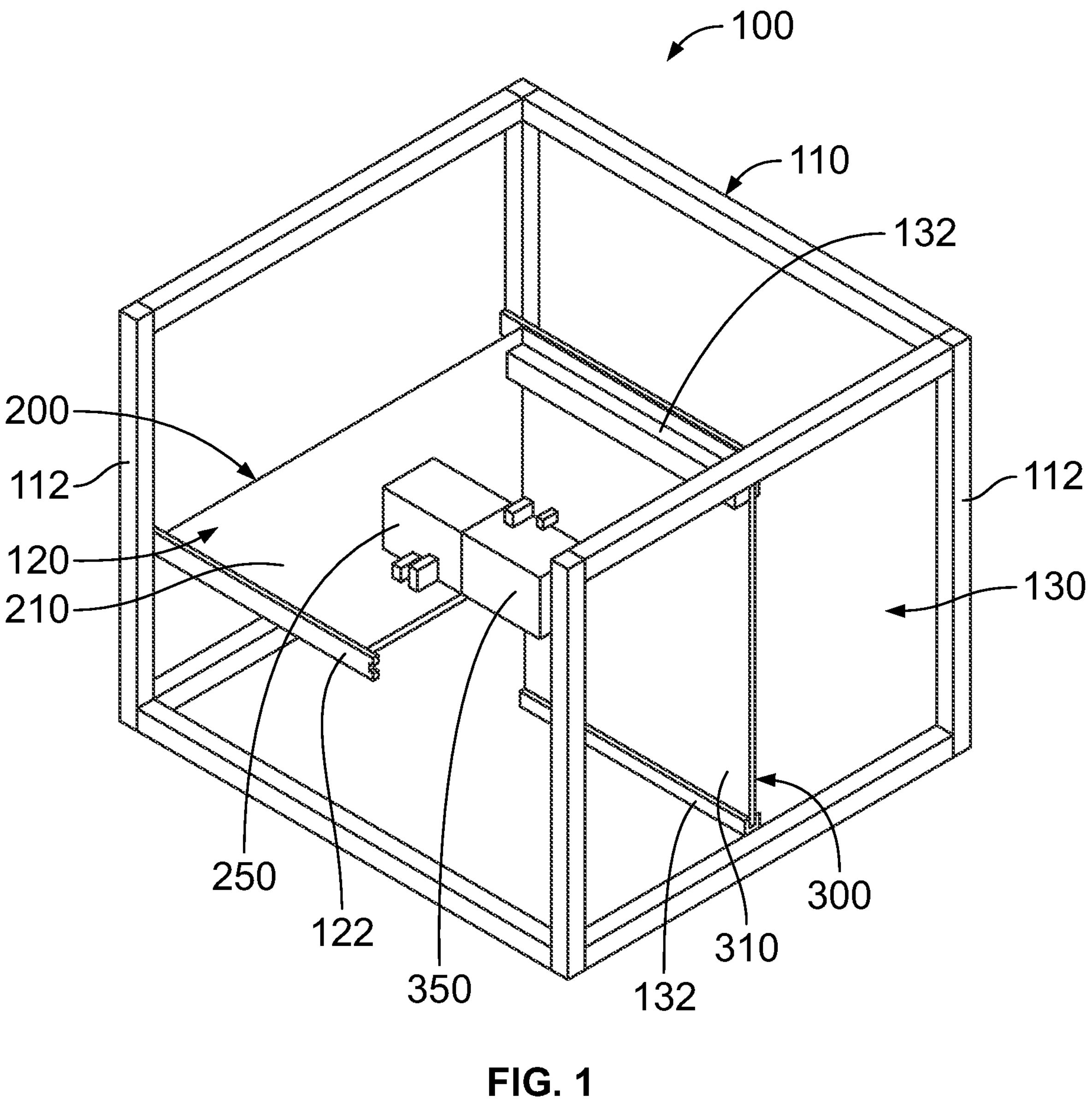
FIG. 1 is a schematic view of a communication system in accordance with an exemplary embodiment.

FIG. 1 is a schematic view of a communication system 100 in accordance with an exemplary embodiment. The communication system 100 includes a first circuit board assembly 200 and a second circuit board assembly 300 electrically coupled together. In various embodiments, the communication system 100 may be a server or network switch. In other various embodiments, the communication system 100 may be a backplane system. The first circuit board assembly 200 and/or the second circuit board assembly 300 may be a backplane assembly. The first circuit board assembly 200 and/or the second circuit board assembly 300 may be a daughtercard assembly. The first circuit board assembly 200 and/or the second circuit board assembly 300 may be a motherboard assembly.

In an exemplary embodiment, the first circuit board assembly 200 and/or the second circuit board assembly 300 includes a compressible mating interface to take up mating tolerance for the communication system 100. For example, the first circuit board assembly 200 and/or the second circuit board assembly 300 may include a spring-loaded connector configured to be compressed in the mating direction. In an exemplary embodiment, the first circuit board assembly 200 and/or the second circuit board assembly 300 is able to float in an X-direction (side-to-side), a Y-direction (top-to-bottom), and/or a Z-direction (front-to-rear) for proper alignment and mating. For example, the connector housing(s) may be movable to align with each other.

In an exemplary embodiment, the communication system 100 includes an equipment rack 110 used to hold the first circuit board assembly 200 and/or the second circuit board assembly 300. The equipment rack 110 includes frame members 112 forming one or more chambers for the first circuit board assembly 200 and/or the second circuit board assembly 300. In the illustrated embodiment, the equipment rack 110 includes a front chamber 120 configured to receive the first circuit board assembly 200 and a rear chamber 130 configured to receive the second circuit board assembly 300. Optionally, multiple circuit board assemblies may be received in the front chamber 120 and/or the rear chamber 130. The equipment rack 110 may be open at the front and/or the rear and/or the sides. Alternatively, the equipment rack 110 may include walls or panels (not shown) that close the chambers 120, 130 at the front and/or the rear and/or the sides. The equipment rack 110 may include horizontally oriented trays or platforms that divide the chambers 120, 130 into stacked sub-chambers each receiving a corresponding circuit board assembly. The equipment rack 110 may include vertically oriented divider walls that divide the chambers 120, 130 into adjacent sub-chambers each receive a corresponding circuit board assembly.

In an exemplary embodiment, the equipment rack 110 includes front guide elements 122 in the front chamber 120. The front guide elements 122 are used to guide the first circuit board assembly 200 into the front chamber 120. The front guide elements 122 may locate the first circuit board assembly 200 relative to the equipment rack 110, such as for mating with the second circuit board assembly 200. In an exemplary embodiment, the front guide elements 122 are rails or tracks having a slot or groove that receive the first circuit board assembly 200. Other types of guide elements may be used in alternative embodiments, such as tabs, pins, posts, openings, sockets, and the like.

In an exemplary embodiment, the equipment rack 110 includes rear guide elements 132 in the rear chamber 130. The rear guide elements 132 are used to guide the second circuit board assembly 300 into the rear chamber 130. The rear guide elements 132 may locate the second circuit board assembly 300 relative to the equipment rack 110, such as for mating with the first circuit board assembly 200. In an exemplary embodiment, the rear guide elements 132 are rails or tracks having a slot or groove that receive the second circuit board assembly 300. Other types of guide elements may be used in alternative embodiments, such as tabs, pins, posts, openings, sockets, and the like.

During assembly, the first circuit board assembly 200 is loaded into the front chamber 120 through the front end and the second circuit board assembly 300 is loaded into the rear chamber 130 through the rear end. The first and second circuit board assemblies 200, 300 are mated within the equipment rack 110, such as at the center of the equipment rack 110. One or both of the electrical connectors of the first and second circuit board assemblies 200, 300 are able to float (for example, move within a confined envelope) relative to the circuit board(s) to properly align and reduce the risk of damage to the components of the electrical connectors. The first and second circuit board assemblies 200, 300 slide into and out of the equipment rack 110, such as along the guide elements 122, 132. In the illustrated embodiment, the first and second circuit board assemblies 200, 300 are oriented perpendicular to each other. For example, the first circuit board assembly 200 is oriented vertically and the second circuit board assembly 300 is oriented horizontally, or vice versa. In other various embodiments, the first and second circuit board assemblies 200, 300 are oriented parallel to each other. For example, the first and second circuit board assemblies 200, 300 may both be oriented vertically. Alternatively, the first and second circuit board assemblies 200, 300 may both be oriented horizontally.

The first circuit board assembly 200 includes a first circuit board 210 and a first electrical connector 250 coupled to the first circuit board 210. The first electrical connector 250 is configured to be mated with the second circuit board assembly 300. Optionally, the first electrical connector 250 is a floating connector, wherein the first electrical connector 250 is movable relative to the first circuit board 210. The first electrical connector 250 may be moved when mated with the second circuit board assembly 300. For example, the first electrical connector 250 may have a compressible mating interface. Alternatively, the first electrical connector 250 may be a fixed connector, wherein the first electrical connector 250 is fixed relative to the first circuit board 210 and does not move relative to the first circuit board 210 when mated with the second circuit board assembly 300.

The second circuit board assembly 300 includes a second circuit board 310 and a second electrical connector 350 coupled to the second circuit board 310. The second electrical connector 350 is configured to be mated with the first electrical connector 250 of the first circuit board assembly 200. Optionally, the second electrical connector 350 may be a floating connector, wherein the second electrical connector 350 is movable relative to the second circuit board 310. The second electrical connector 350 may be moved when mated with the second circuit board assembly 300. For example, the second electrical connector 350 may have a compressible mating interface. Alternatively, the second electrical connector 350 may be a fixed connector, wherein the second electrical connector 350 is fixed relative to the second circuit board 310 and does not move relative to the second circuit board 310 when mated with the first electrical connector 250.

Figure 2:
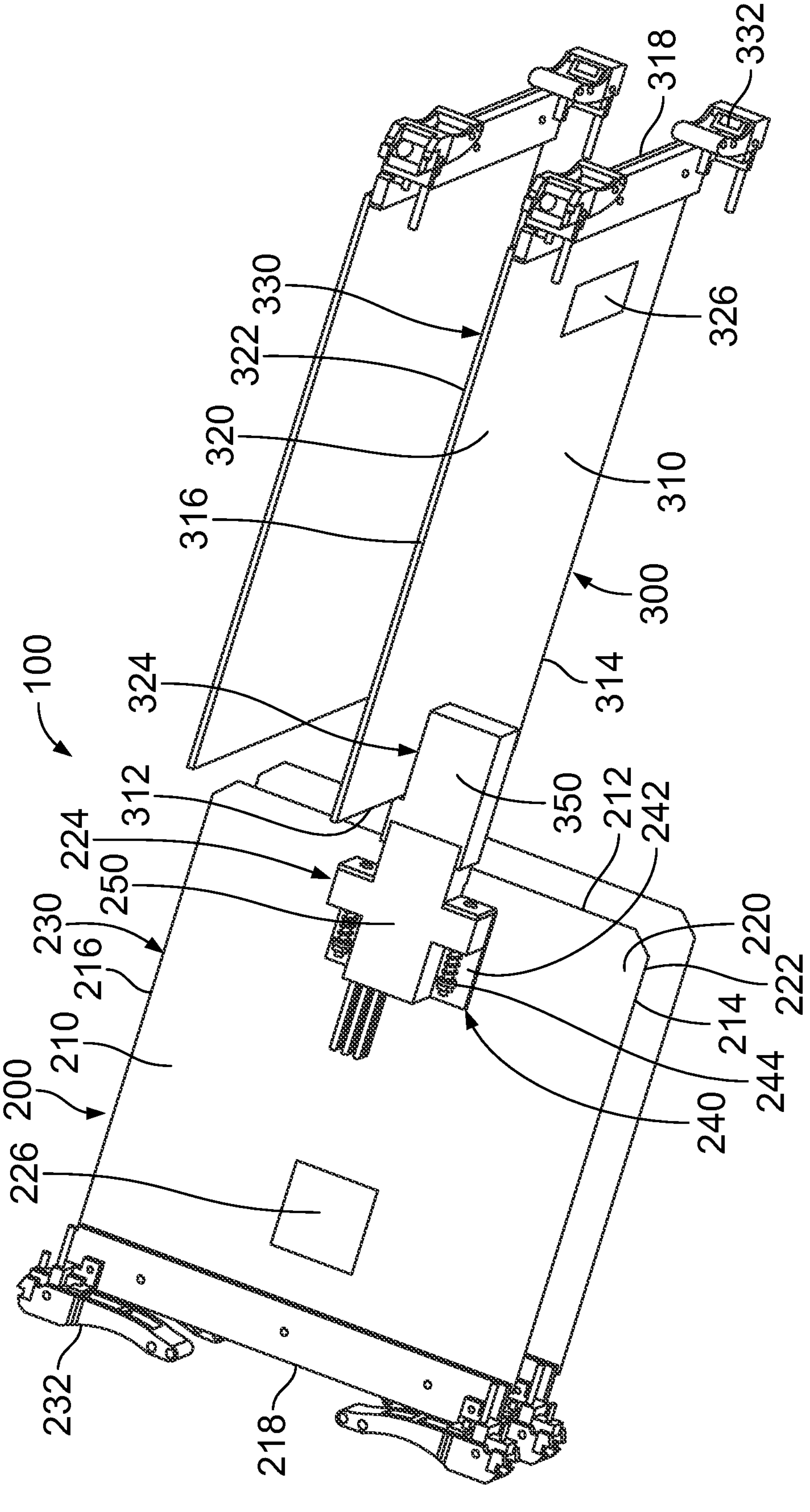
FIG. 2 is a top perspective view of the communication system in accordance with an exemplary embodiment.
Figure 3:
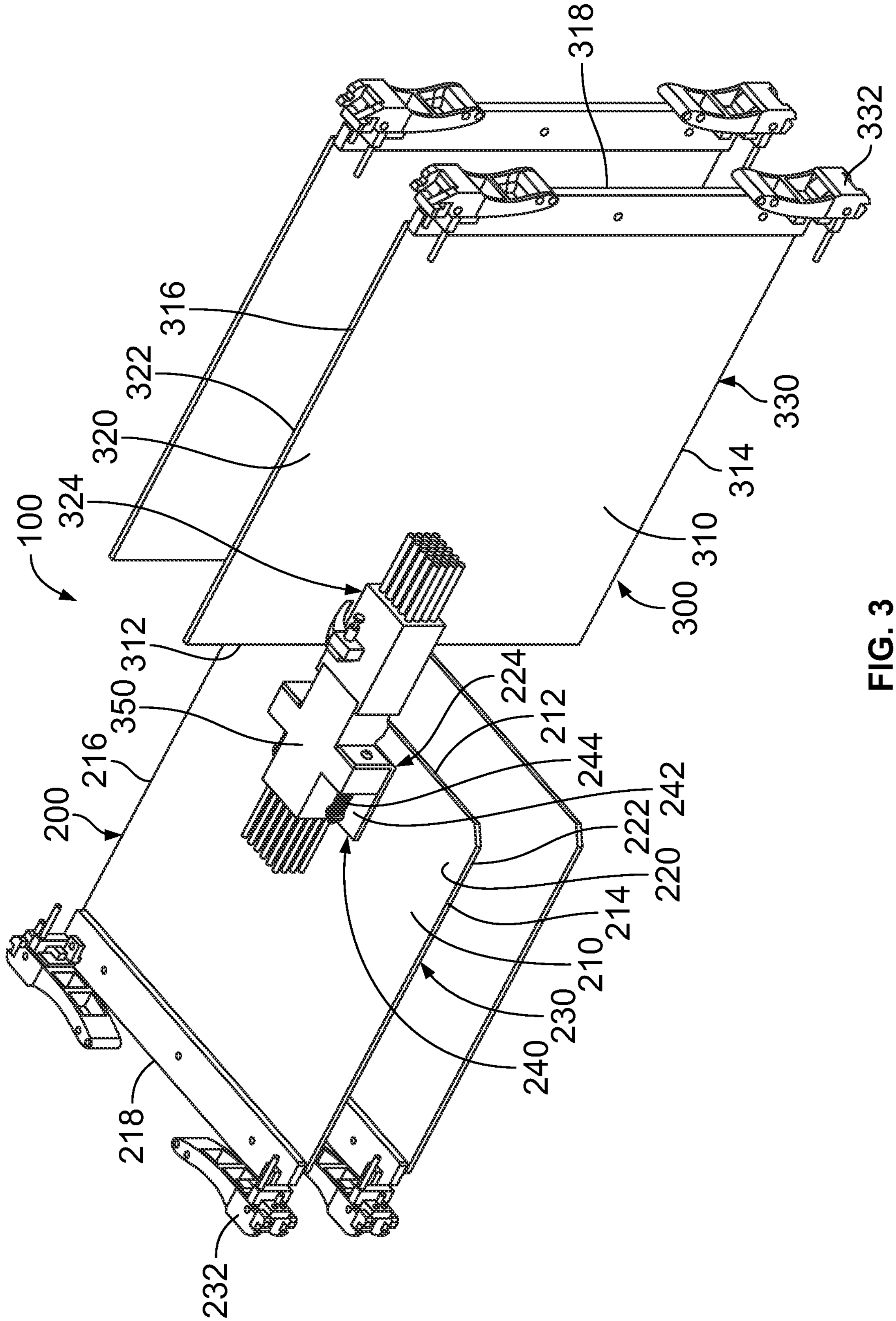
FIG. 3 is a rear perspective view of the communication system in accordance with an exemplary embodiment.

FIG. 2 is a top perspective view of the communication system 100 in accordance with an exemplary embodiment. FIG. 3 is a rear perspective view of the communication system 100 in accordance with an exemplary embodiment. FIG. 2 shows the first electrical connector 250 as a cable connector and the second electrical connector 350 as a board connector. The first electrical connector 250 is a floating connector and the second electrical connector 350 is a fixed connector. FIG. 3 shows the first electrical connector 250 as a cable connector and the second electrical connector 350 as a cable connector. The first electrical connector 250 is a floating connector and the second electrical connector 350 is a fixed connector. In alternative embodiments, the second electrical connector 350 may be a floating connector.

In the illustrated embodiments, the communication system 100 includes multiple front circuit board assemblies 200 and multiple rear circuit board assemblies 300; however, the communication system 100 may include a single front circuit board assembly 200 and/or a single rear circuit board assembly 300. In the illustrated embodiment, the circuit board 210 has a single electrical connector 250 and the circuit board 310 has a single electrical connector 350; however, the circuit board 210 may include multiple electrical connectors 250 and/or the circuit board 310 may include multiple electrical connectors 350.

The first circuit board 210 includes a mating edge 212 at a front of the first circuit board 210 and side edges 214, 216 extending between the mating edge 212 and a rear edge 218. The first circuit board 210 is rectangular in the illustrated embodiment. The first circuit board 210 may have other shapes in alternative embodiments. The circuit board 210 includes first and second surfaces 220, 222 (for example, upper and lower surfaces). The first electrical connector 250 is mounted to the first surface 220 of the circuit board 210 at a mounting area 224. Optionally, the mounting area 224 may be located proximate to the mating edge 212. One or more electrical connectors may additionally or alternatively be located at the second surface 222.

In an exemplary embodiment, the first circuit board 210 includes one or more electrical components 226 coupled to the first circuit board 210. The electrical components 226 may be chips, integrated circuits, processors, memory modules, electrical connectors or other components. The electrical components 226 may be electrically connected to the circuit board 210, such as through traces, pads, vias or other circuits. In an exemplary embodiment, the electrical components 226 are electrically connected to the first electrical connector 250, such as through the first circuit board 210 or by direct connection through the cables.

The first circuit board 210 includes one or more board guide features 230 for locating the circuit board 210 in the equipment rack 110 (shown in FIG. 1). The board guide features 230 are configured to be coupled to the corresponding guide elements 122 (shown in FIG. 1). In the illustrated embodiment, the board guide features 230 are defined by the edges of the circuit board 210 along the sides 214, 216, which are configured to slide into grooves of the track defining the guide elements 122. Other types of guide features may be used in alternative embodiments, such as rails, slots tabs, pins, and the like.

In an exemplary embodiment, the first circuit board assembly 200 includes latching features 232 at the rear edge 218. The latching features 232 are used to secure the first circuit board assembly 200 to the equipment rack 110. The latching features 232 may be used to press the circuit board 210 forward (toward the second circuit board 310) during mating or may be used to pull the circuit board 210 rearward during unmating.

In an exemplary embodiment, the first circuit board assembly 200 includes a first connector mount 240. The first connector mount 240 includes a bracket 242 and one or more biasing members 244 coupled to the bracket 242 and the electrical connector 250. The electrical connector 250 is movably coupled to the connector mount 240. For example, the electrical connector 250 may be moved in the X-direction (side-to-side), the Y-direction (top-to-bottom), and/or the Z-direction (front-to-rear). The biasing members 244 forward bias the electrical connector 250 (in the Z-direction) for mating with the second electrical connector 350. In an exemplary embodiment, the biasing members 244 include springs, such as coil springs. Other types of biasing members may be used in alternative embodiments, such as compressible foam members. The biasing members 244 may provide a flexible connection between the electrical connector 250 and the connector mount 240.

The biasing members 244 allow the electrical connector 250 to move relative to the circuit board 210, such as during mating with the second electrical connector 350. The biasing members 244 provide compressive forces for maintaining mechanical and electrical connection between the first and second electrical connectors 250, 350. The biasing members 244 accommodate the mating tolerances between the circuit board assemblies 200, 300 within the equipment rack 110. For example, the circuit board 210 may have a positional range within the equipment rack 110 (for example, position of the mating edge 212 within the equipment rack 110 may vary by approximately 1.5 mm). The biasing members 244 may accommodate some or all of the mating dimensional tolerance distance (for example, approximately 1.5 mm) of the circuit board 210 in the equipment rack 110.

The second circuit board 310 includes a mating edge 312 at a front of the second circuit board 310 and side edges 314, 316 extending between the mating edge 312 and a rear edge 318. The mating edge 312 faces the mating edge 212 of the first circuit board 210. The circuit board 310 includes first and second surfaces 320, 322 (for example, left side and right side). The second electrical connector 350 is mounted to the first surface 320 of the circuit board 310 at a mounting area 324. Optionally, the mounting area 324 may be located proximate to the mating edge 312. One or more electrical connectors may additionally or alternatively be located at the second surface 322.

In an exemplary embodiment, the second circuit board 310 includes one or more electrical components 326 coupled to the second circuit board 310. The electrical components 326 may be chips, integrated circuits, processors, memory modules, electrical connectors or other components. The electrical components 326 may be electrically connected to the circuit board 310, such as through traces, pads, vias or other circuits. In an exemplary embodiment, the electrical components 326 are electrically connected to the second electrical connector 350, such as through the second circuit board 310 or by direct connection through cables.

The second circuit board 310 includes one or more board guide features 330 for locating the circuit board 310 in the equipment rack 110 (shown in FIG. 1). The board guide features 330 are configured to be coupled to the corresponding guide elements 132 (shown in FIG. 1). In the illustrated embodiment, the board guide features 330 are defined by the edges of the circuit board 310 along the sides 314, 316, which are configured to slide into grooves of the track defining the guide elements 132. Other types of guide features may be used in alternative embodiments, such as rails, slots tabs, pins, and the like.

In an exemplary embodiment, the second circuit board assembly 300 includes latching features 332 at the rear edge 318. The latching features 332 are used to secure the second circuit board assembly 300 to the equipment rack 110. The latching features 332 may be used to press the circuit board 310 forward (toward the first circuit board 210) during mating or may be used to pull the circuit board 310 rearward during unmating.

Figure 4:
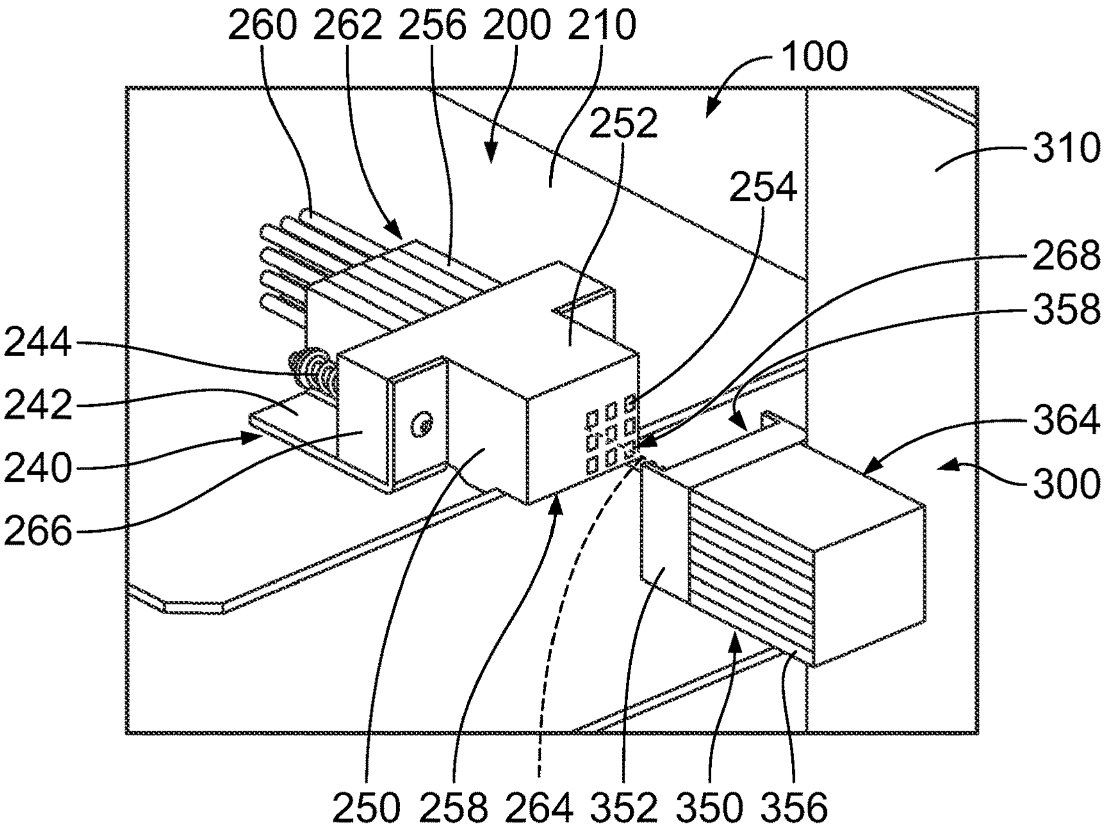
FIG. 4 is a perspective view of a portion of the communication system showing the mating interface of the first circuit board assembly in accordance with an exemplary embodiment.
Figure 5:
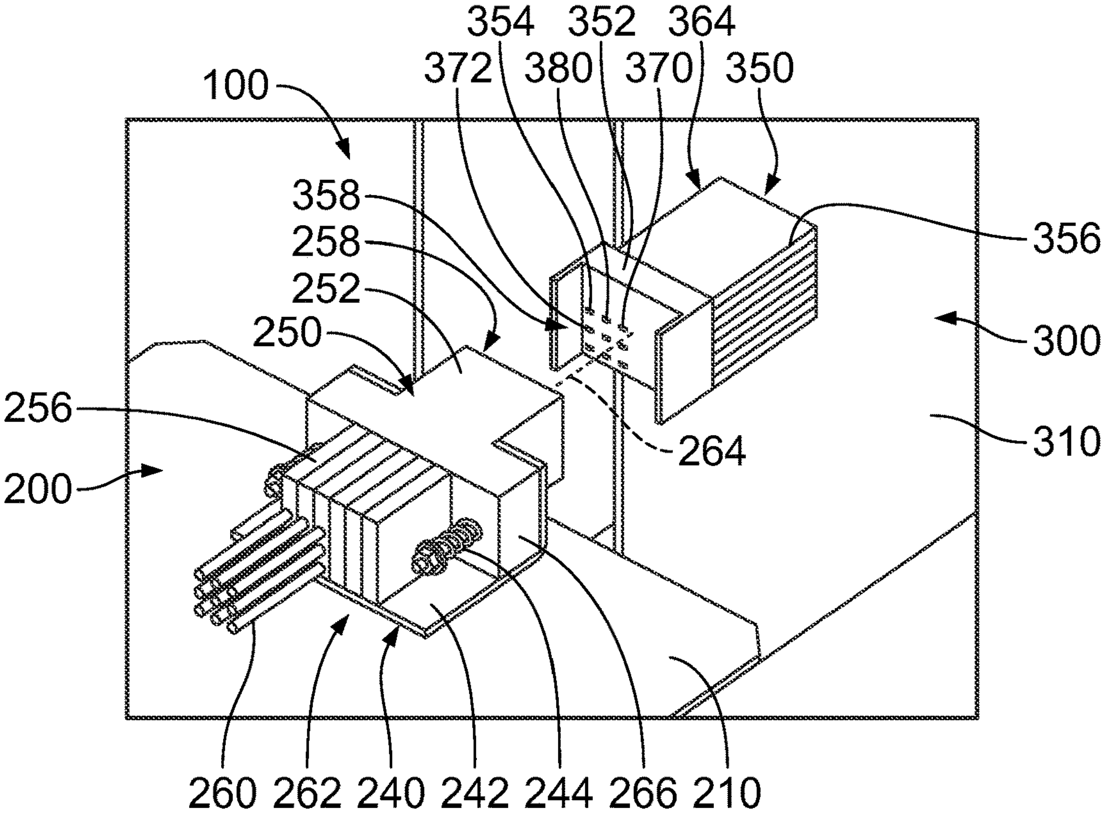
FIG. 5 is a perspective view of a portion of the communication system showing the mating interface of the second circuit board assembly in accordance with an exemplary embodiment.

FIG. 4 is a perspective view of a portion of the communication system 100 showing the mating interface of the first circuit board assembly 200 in accordance with an exemplary embodiment. FIG. 5 is a perspective view of a portion of the communication system 100 showing the mating interface of the second circuit board assembly 300 in accordance with an exemplary embodiment. The first circuit board assembly 200 has a compressible mating interface in the illustrated embodiment (for example, the first electrical connector 250 is movable relative to the first circuit board 210). The second circuit board assembly 300 has a fixed mating interface in the illustrated embodiment (for example, the second electrical connector 350 is fixed relative to the second circuit board 310).

The first electrical connector 250 includes a connector housing 252 holding first contacts 254 (FIG. 4) in a contact array. In various embodiments, the contacts 254 may be arranged together in first contact modules 256, also known as chicklets, which may be overmolded leadframes. The connector housing 252 includes a mating end 258 configured to be mated with the second electrical connector 350. The mating end 258 is at the front of the connector housing 252. The contacts 254 are exposed at the mating end 258 for mating with corresponding contacts of the second electrical connector 350.

In the illustrated embodiment, the first electrical connector 250 is a cable connector having a plurality of first cables 260 extending from the connector housing 252. The connector housing 252 includes a cable end 262. The cables 260 extend from the cable end 262. In the illustrated embodiment, the cable end 262 is opposite the mating end 258; however, other orientations are possible in alternative embodiments, such as being a right-angle connector with the cable end 262 perpendicular to the mating end 258. The cables 260 may be individual cables 260, such as coaxial cables or twin axial cables. In other embodiments, the cables 260 may be flat, flexible cables, such as flex circuits. The cables 260 are electrically connected to corresponding contacts 254. The cables 260 are flexible to allow movement of the first electrical connector 250 relative to the first circuit board 210.

The first electrical connector 250 is configured to be mated with the second electrical connector 350 in a mating direction (along a mating axis 264). The mating end 258 may be perpendicular to the mating axis 264. In an exemplary embodiment, the first electrical connector 250 is movable in a direction parallel to the mating axis 264 (Z-direction). For example, the first electrical connector 250 may be pressed rearward during mating. In an exemplary embodiment, the first electrical connector 250 is movable in a direction perpendicular to the mating axis 264 (for example, side-to-side and/or top-to-bottom).

In an exemplary embodiment, the connector housing 252 includes one or more mounting features 266. The mounting features 266 may be tabs or ears extending from one or more sides of the connector housing 252. The mounting features 266 are coupled to the connector mount 240, such as to the bracket 242. In an exemplary embodiment, the biasing members 244 are coupled to the mounting features 266. The biasing members 244 may press the mounting features 266 forward against the bracket 242. The bracket 242 operates as a forward stop for the connector housing 252. The bracket 242 positions the first electrical connector 250 for mating with the second electrical connector 350. The connector housing 252 may be movable relative to the bracket 242, such as sliding side-to-side or up-and-down on the bracket 242.

The contacts 254 are provided at the mating end 258 for mating with the second electrical connector 350. In an exemplary embodiment, the contacts 254 are stamped and formed contacts. The contacts 254 have a metal body extending between a mating end 268 and a terminating end (not shown) opposite the mating end 268. In an exemplary embodiment, conductors of the cables 260 are terminated to the terminating end of the corresponding contacts 254. For example, the terminating end may include a solder pad, a crimp barrel, an insulation displacement termination, or another type of electrical termination. In alternative embodiments, rather than being terminated to the cables 260, the terminating ends of the contacts 254 may be terminated directly to the circuit board 210, such as being soldered or press fit into plated vias of the circuit board 210. In such embodiment, the first electrical connector 250 may be fixed relative to the circuit board 210.

The mating end 268 of each contact 254 includes a mating interface configured to be electrically connected to the corresponding contact of the second electrical connector 350. The mating ends 268 may be spring beams, pins, sockets, pads, and the like. In an exemplary embodiment, the mating end 268 has a short electrical length downstream of the mating interface, leading to a short electrical stub. Because the first electrical connector 250 is able to float relative to the first circuit board 210, the mating ends 268 of the contacts 254 are very short as the mating ends 268 do not need to accommodate the tolerance of the circuit board mating as such tolerance is accommodated by the spring loaded, floating movement of the electrical connector 250 (for example, as provided by the biasing members 244). The length of the stub at the mating end 268 may be short enough to just accommodate mechanical mating plus any contact wipe, but does not need to accommodate any circuit board mating tolerance.

The second electrical connector 350 includes a connector housing 352 holding second contacts 354 (FIG. 5) in a contact array. In various embodiments, the contacts 354 may be arranged together in second contact modules 356, also known as chicklets, which may be overmolded leadframes. The connector housing 352 includes a mating end 358 configured to be mated with the first electrical connector 250. The mating end 358 is at the front of the connector housing 352 (facing the mating end 258 of the first electrical connector 250). The second contacts 354 are exposed at the mating end 358 for mating with the first contacts 254.

In the illustrated embodiment, the second electrical connector 350 is a board connector configured to be mounted directly to the second circuit board 310. The connector housing 352 includes a mounting end 364 mounted to the second circuit board 310. In the illustrated embodiment, the second electrical connector 350 is a right-angle connector having the mounting end 364 perpendicular to the mating end 358; however, other orientations are possible in alternative embodiments. The connector housing 352 may include mounting features for mounting the connector housing 352 to the circuit board 310, such as mounting lugs that receive threaded fasteners, press tabs, solder tabs, and the like. Alternatively, the contacts 354 may be used to mount the second electrical connector 350 to the circuit board 310, such as using press fit pins.

The second electrical connector 350 is configured to be mated with the first electrical connector 250 in the mating direction along the mating axis 264. The first electrical connector 350 may be pressed rearward during mating as the second circuit board assembly 300 is loaded into the equipment rack 110. The movement of the first electrical connector 350 allows the contacts 254, 354 to be relatively short as the contacts 254, 354 do not need to accommodate for the circuit board mating tolerance, which may be approximately 1.5 mm, meaning that the first contacts 254 and/or the second contacts 354 may be shortened, such as by approximately 1.5 mm compared to other systems.

The contacts 354 are provided at the mating end 358 for mating with the second electrical connector 350. In an exemplary embodiment, the contacts 354 are stamped and formed contacts. The contacts 354 have a metal body 370 extending between a mating end 372 and a terminating end (not shown) opposite the mating end 372. The contacts 354 have mating interfaces 380 at the mating ends 372. In an exemplary embodiment, the terminating ends of the contacts 354 may be terminated directly to the circuit board 310, such as being soldered or press-fit into plated vias of the circuit board 310. Alternatively, the contacts 354 may be terminated to cables rather than directly to the circuit board 310.

The mating end 372 of each second contact 354 includes a mating interface configured to be electrically connected to the first contact 254. The mating ends 372 may include spring beams, pads, pins, sockets, and the like. In an exemplary embodiment, the mating end 372 has a short electrical length downstream of the mating interface, leading to a short electrical stub. Because the first electrical connector 250 is able to float (press rearward) when mated with the second electrical connector 350, the mating ends 372 of the contacts 354 are very short as the mating ends 372 do not need to accommodate the tolerance of the circuit board mating as such tolerance is accommodated by the spring loaded, floating movement of the first electrical connector 250. The length of the stub at the mating end 372 may be short enough to just accommodate mechanical mating plus any contact wipe, but does not need to accommodate any circuit board mating tolerance.

The floating mounting system provided by the connector mount 240 and the biasing members 244 for the first electrical connector 250 (and similarly may be provided for the second electrical connector 350) absorbs the circuit board mating tolerance (for example, absorbs 1.5 mm mating tolerance or more) and may allow alignment of the first and second electrical connectors 250, 350. The floating mounting system eliminates the need for additional alignment features, such as alignment modules mounted to the circuit boards adjacent the electrical connectors 250, 350, which add cost and occupy valuable space on the circuit boards. The floating mounting system eliminates the need for the contact interface to be able to absorb the large rack mating tolerances allowing shorting contacts. The stubs at the ends of the contacts 254 and/or 354 may be shortened (for example, less than 1.0 mm), which improves the performance of the communication system 100 by improving the signal integrity along the signal paths. The performance, particularly at high speeds (for example, above 100 Gbps and more particularly, above 200 Gbps) is improved compared to contacts having long electrical stubs.

Figure 6:
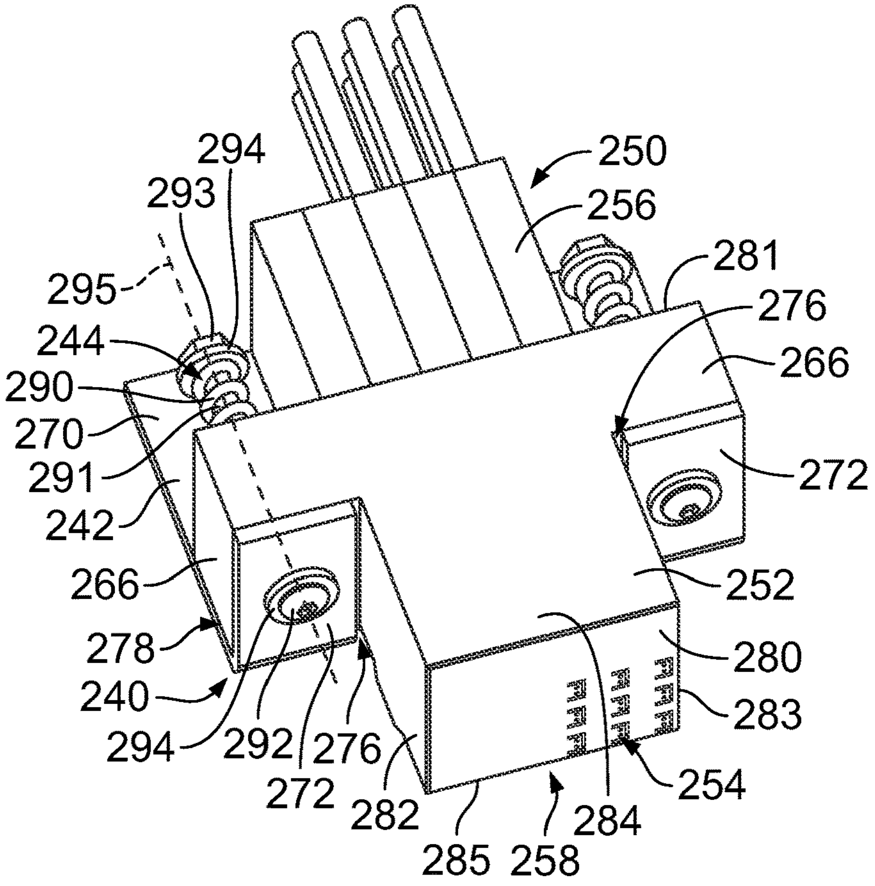
FIG. 6 is a front perspective view of the first electrical connector in accordance with an exemplary embodiment.
Figure 7:
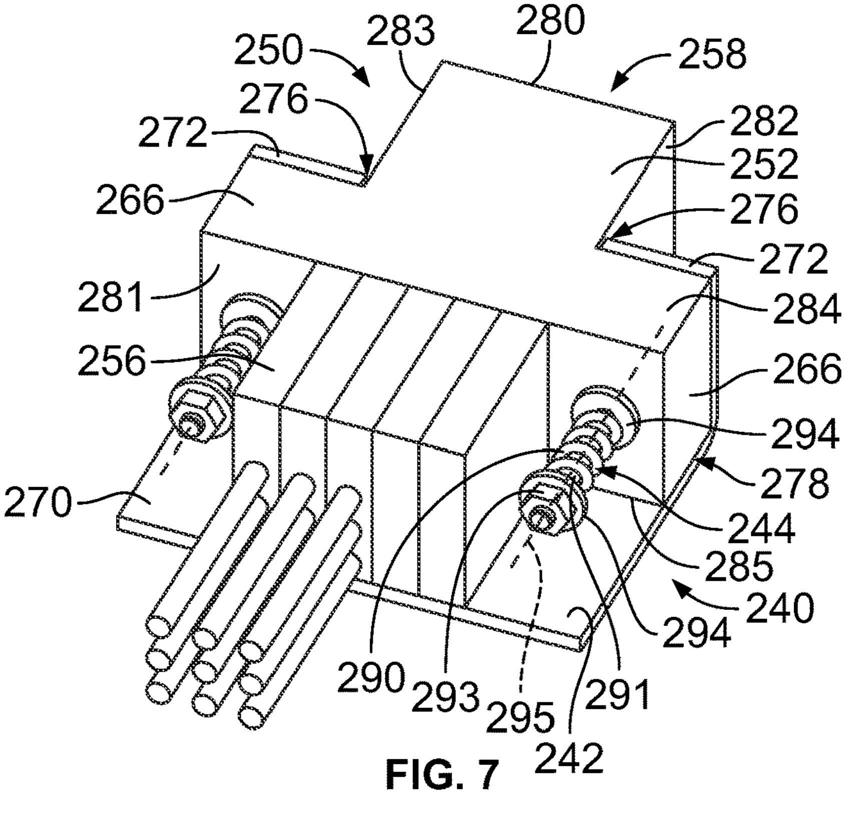
FIG. 7 is a rear perspective view of the first electrical connector in accordance with an exemplary embodiment.

FIG. 6 is a front perspective view of the first electrical connector 250 in accordance with an exemplary embodiment. FIG. 7 is a rear perspective view of the first electrical connector 250 in accordance with an exemplary embodiment. FIGS. 6 and 7 illustrate the connector housing 252 coupled to the connector mount 240.

The bracket 242 of the connector mount 240 includes a mounting plate 270 and mounting tabs 272 extending from the mounting plate 270. The mounting plate 270 is configured to be mounted to the first circuit board 210 (shown in FIG. 3). In an exemplary embodiment, the mounting plate 270 is oriented horizontally. The mounting tabs 272 extends perpendicular to the mounting plate 270. For example, the mounting tabs 272 extend outward (i.e., vertically) from the mounting plate 270. The mounting features 266 of the connector housing 252 are configured to be mounted to the mounting tabs 272. For example, the connector housing 252 is located in the space between the mounting tabs 272 and the mounting features 266 are located behind the mounting tabs 272. The biasing members 244 coupled to the mounting features 266 to the mounting tabs 272. The mounting tabs 272 stop forward movement of the mounting tabs 272 to position the connector housing 252 relative to the bracket 242. In an exemplary embodiment, the mounting tabs 272 include bracket openings 274 (shown in FIG. 12) therethrough that receive portions of the biasing members 244. In an exemplary embodiment, the spacing between the mounting tabs 272 is larger than the width of the connector housing 252 such that the clearance gaps 276 are located between the mounting tabs 272 and the connector housing 252. The clearance gaps 276 allow the connector housing 252 to move between the mounting tabs 272. For example, the connector housing 252 is able to move side-to-side between the mounting tabs 272. In various embodiments, clearance gaps 278 may be located between the mounting features 266 and the mounting plate 270. The clearance gaps 278 allow the connector housing 252 to move relative to the mounting plate 270 (for example, top-to-bottom movement).

The connector housing 252 is a dielectric housing, such as a plastic housing. The connector housing 252 holds the contacts 254. For example, the connector housing 252 may hold the contact modules 256. The connector housing 252 includes a front 280 and a rear 281. The connector housing 252 includes a first side 282 and a second side 283. The connector housing 252 includes a top 284 and the bottom 285. In the illustrated embodiment, the connector housing 252 is generally rectangular. However, the connector housing 252 may have other shapes in alternative embodiments. In the illustrated embodiment, the mounting features 266 extend outward from the first and second sides 282, 283. The mounting features 266 may be provided at other locations in alternative embodiments. In an exemplary embodiment, the front 280 defines the mating end 258. In the illustrated embodiment, the bottom 285 is configured to face the circuit board 210. The bottom 285 faces the mounting plate 270. For example, the mounting plate 270 may be located between the bottom 285 and the circuit board 210.

In an exemplary embodiment, the mounting features 266 include openings 286 (shown in FIG. 8) therethrough. The openings 286 are configured to receive portions of the biasing members 244. For example, the biasing members 244 may pass through the openings 286. The openings 286 may be aligned with the bracket openings 274 to allow the biasing members 244 to pass through the mounting tabs 272 and the mounting features 266. Optionally, the openings 286 may be approximately centered on the mounting features 266.

In an exemplary embodiment, the biasing members 244 each include a spring member 290 and a spring pin 291 used to couple the spring member 290 to the mounting feature 266 and/or the mounting tab 272. The spring pin 291 may be a threaded fastener, such as a bolt, in various embodiments. The spring pin 291 includes a head 292 at a front of the spring pin 291. In an exemplary embodiment, a securing nut 293 is coupled to the distal end of the spring pin 291. For example, the securing nut 293 may be threadably coupled to the end of the spring pin 291. Washers 294 may be held on the spring pin 291, such as at the head 292 and/or at the securing nut 293 and/or at other locations, such as at the mounting feature 266 and/or the mounting tab 272. The spring pin 291 passes through the mounting feature 266 and the mounting tab 272. The spring pin 291 passes through the spring member 290. For example, the spring member 290 may be a coil spring having a central bore that receives the spring pin 291. The spring member 290 is located between the securing nut 293 and the mounting feature 266.

The spring member 290 presses forward against the rear of the mounting feature 266 to forward bias the electrical connector 250 for mating with the second electrical connector 350 (shown in FIG. 4). The spring member 290 is compressible along a compression axis 295 to allow front-to-rear movement. The compression axis 295 is parallel to the mating direction (for example, Z-direction). The connector housing 252 is movable relative to the bracket 242 along the compression axis 295 when the spring member 290 is compressed, such as during mating with the second electrical connector 350.

In an exemplary embodiment, the biasing member 244 is movable relative to the connector housing 252 and/or relative to the bracket 242 and at least one floating direction perpendicular to the mating direction. For example, the biasing member 244 may be loose fit through the connector housing 252 and/or the bracket 242 to allow the floating movement, such as side-to-side and/or top-to-bottom. In various embodiments, the spring pin 291 may move up and down and/or left and right within the opening 286 through the mounting feature 266 to allow the floating movement or the mounting feature 266 may move up and down and/or left and right on the spring pin 291 to allow the floating movement. In various embodiments, the spring pin 291 may move up and down and/or left and right within the bracket opening 274 through the mounting tab 272 to allow the floating movement.

Figure 8:
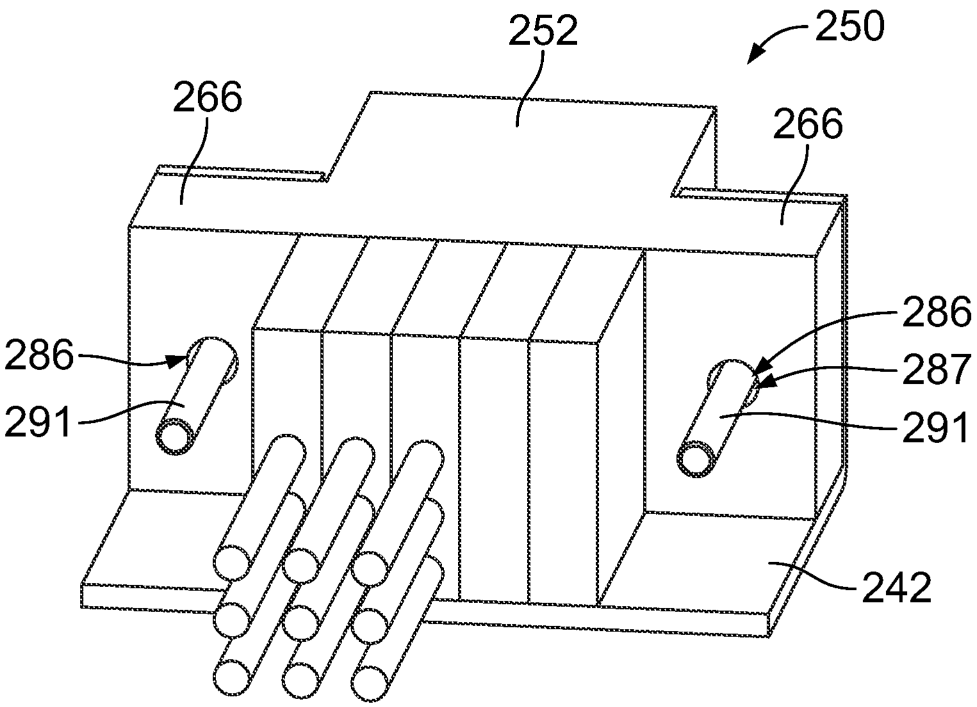
FIG. 8 is a rear perspective view of a portion of the first electrical connector in accordance with an exemplary embodiment.
Figure 9:
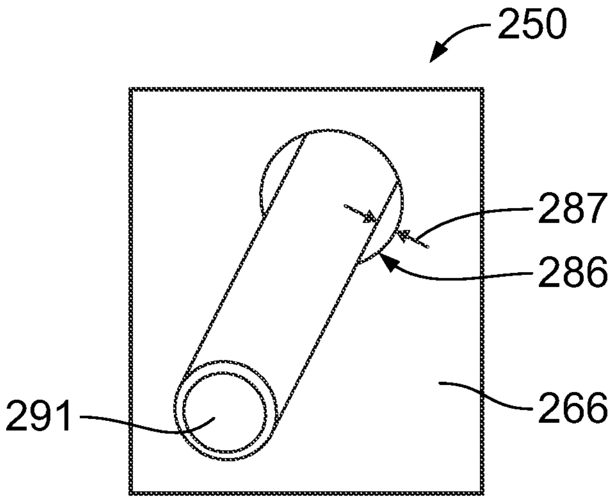
FIG. 9 is an enlarged rear perspective view of a portion of the first electrical connector in accordance with an exemplary embodiment.

FIG. 8 is a rear perspective view of a portion of the first electrical connector 250 in accordance with an exemplary embodiment. FIG. 9 is an enlarged rear perspective view of a portion of the first electrical connector 250 in accordance with an exemplary embodiment. FIGS. 8 and 9 illustrate the connector housing 252 coupled to the bracket 242. The spring pins 291 are illustrated in FIGS. 8 and 9. The spring pins 291 pass through the openings 286 and the mounting features 266.

In an exemplary embodiment, the openings 286 are oversized relative to the spring pins 291. For example, the openings 286 have larger diameters than the diameters of the spring pins 291. Clearance gaps 287 are provided between the mounting features 266 and the spring pins 291. The clearance gaps 287 provide a space of relative movement between the mounting features 266 and the spring pins 291. The clearance gaps 287 define confined envelopes for the floating movement of the connector housing 252. For example, the connector housing 252 may move upward or downward until the mounting features 266 bottom out against the spring pins 291. The connector housing 252 may move right or left until the mounting features 266 bottom out against the spring pins 291. Optionally, the size and shape of the openings 286 may accommodate movement in all directions. Alternatively, the size and shape of the openings 286 may accommodate movement in a limited number of directions (for example, only up and down or only left and right). In various embodiments, the size and shape of the openings 286 may accommodate a greater range of motion in some directions and a more limited range of motion in other directions.

Figure 10:
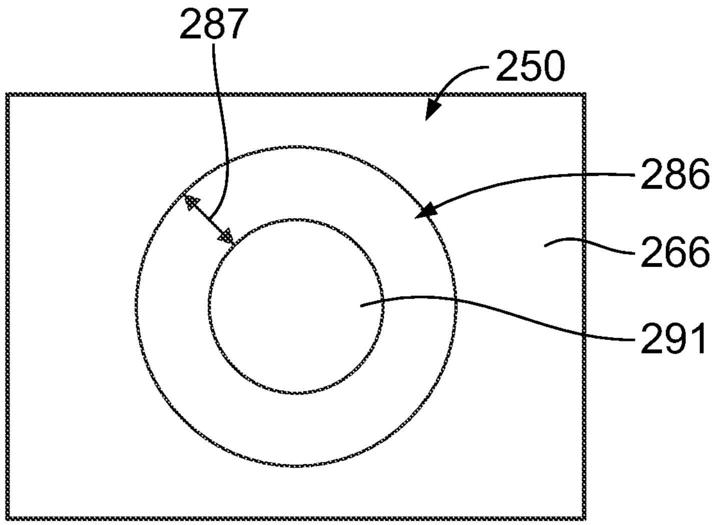
FIG. 10 is a rear view of a portion of the first electrical connector in accordance with an exemplary embodiment.

FIG. 10 is a rear view of a portion of the first electrical connector 250 in accordance with an exemplary embodiment. FIG. 10 shows the spring pin 291 within the opening 286 of the mounting feature 266. In the illustrated embodiment, the spring pin 291 is cylindrical the opening 286 is cylindrical having a greater diameter than the diameter of the spring pin 291. The oversized diameter of the opening 286 forms the clearance gap 287. The size of the clearance gap 287 is based on the oversizing of the opening 286 relative to the spring pin 291. In various embodiments, the spring pin 291 may be centered in the opening 286 providing equal clearance gaps 287 circumferentially around the spring pin 291 allowing movement in all directions. Alternatively, the spring pin 291 may sit off centered within the opening 286 allowing greater movement in some directions than other directions.

Figure 11:
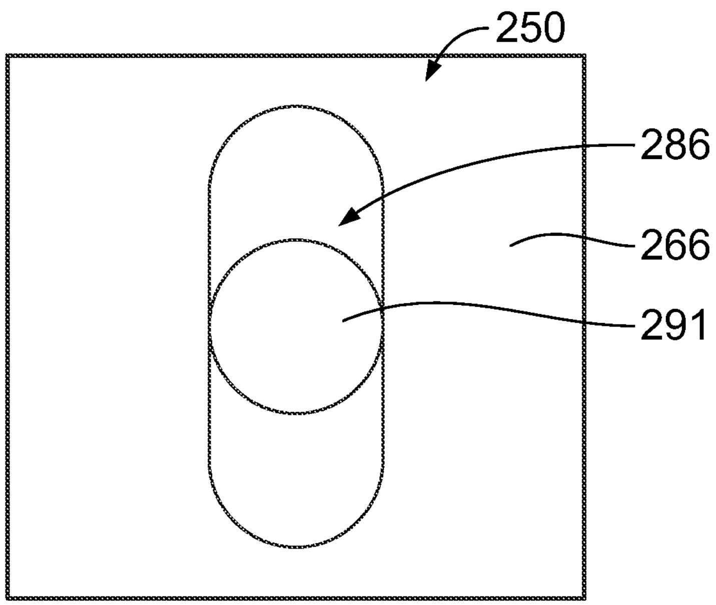
FIG. 11 is a rear view of a portion of the first electrical connector in accordance with an exemplary embodiment.

FIG. 11 is a rear view of a portion of the first electrical connector 250 in accordance with an exemplary embodiment. FIG. 11 shows the spring pin 291 within the opening 286 of the mounting feature 266 in the illustrated embodiment, the opening 286 is oval-shaped having a larger dimension in the vertical direction and a smaller dimension in the horizontal direction. The horizontal dimension may be approximately equal to the diameter of the spring pin 291 thus restricting right to left movement. However, the oval-shaped of the opening 286 allows vertical movement of the mounting feature 266 relative to the spring pin 291. The opening 286 may have other shapes in alternative embodiments to allow controlled, floating movement of the mounting feature 266 relative to the spring pin 291.

Figure 12:
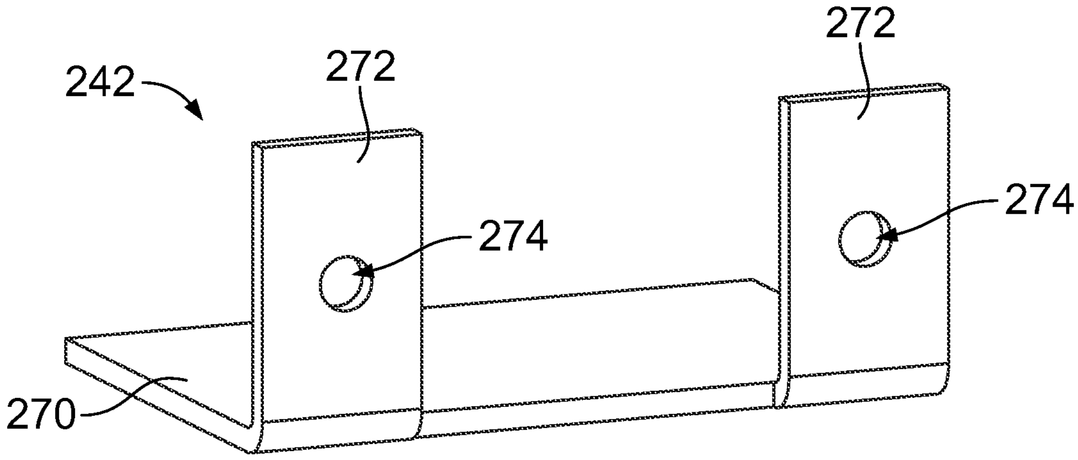
FIG. 12 is a front perspective view of the bracket in accordance with an exemplary embodiment.

FIG. 12 is a front perspective view of the bracket 242 in accordance with an exemplary embodiment. The bracket 242 includes the mounting plate 270 and the mounting tabs 272. The mounting tabs 272 include the bracket openings 274. In the illustrated embodiment, the bracket openings 274 are cylindrical. However, the bracket openings 274 may have other shapes in alternative embodiments. For example, the bracket openings 274 may be oval-shaped. The bracket openings 274 may be sized relative to the spring pins 291 (shown in FIG. 13). In various embodiments, the bracket openings 274 may have diameters approximately equal to the diameters of the spring pins 291 such that the spring pins 291 are fixed in position relative to the mounting tabs 272. Alternatively, the bracket openings 274 may be enlarged or oversized relative to the diameters of the spring pins 291 such that the spring pins 291 are allowed a limited amount of floating movement within the bracket openings 274. The mounting tabs 272 confine the floating movement within a confined envelope defined by the size and shape of the bracket openings 274.

Figure 13:
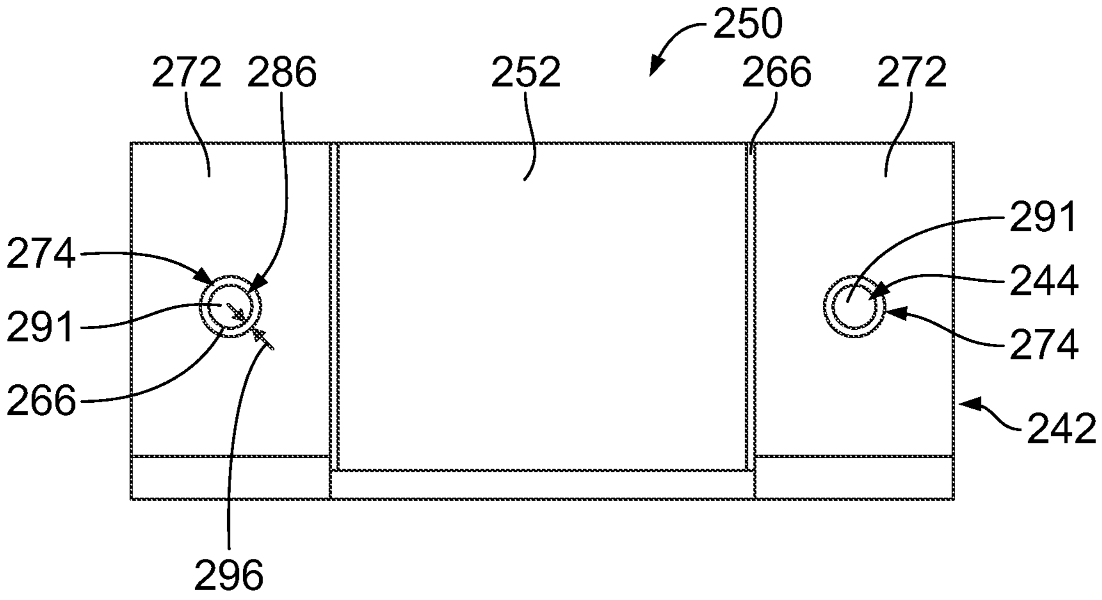
FIG. 13 is a front, partial sectional view of a portion of the first electrical connector in accordance with an exemplary embodiment

FIG. 13 is a front, partial sectional view of a portion of the first electrical connector 250 in accordance with an exemplary embodiment. FIG. 13 shows the connector housing 252 coupled to the bracket 242. Portions of the biasing members 244 are shown in FIG. 13. For example, the spring pins 291 are shown in cross-section cut off at the front surface of the mounting tabs 272.

In the illustrated embodiment, the bracket openings 274 are oversized relative to the spring pins 291. The spring pins 291 extend forward from the mounting features 266 of the connector housing 252 through the bracket openings 274. In an exemplary embodiment, the spring pins 291 are tightly held in the mounting features 266. For example, the openings 286 through the mounting features 266 may have diameters equal to the diameters of the spring pins 291 such that the spring pins 291 to not move relative to the mounting features 266. The spring pins 291 extend through the bracket openings 274. The bracket openings 274 are oversized relative to the spring pins 291 forming clearance gaps 296 between the spring pins 291 and the mounting tabs 272. The clearance gaps 296 allow the spring pins 291 to move within the bracket openings 274. As such, the mounting features 266, and the connector housing 252, are able to move relative to the mounting tabs 272. The bracket openings 274 form a confined envelope to limit and control the amount of floating movement of the spring pins 291 relative to the mounting tabs 272. The size and shapes of the bracket openings 274 control the floating movement direction(s). For example, the bracket openings 274 may be oversized to allow floating movement in all directions. Alternatively, the bracket openings 274 may be oversized to allow floating movement in only some directions and confined movement in other directions.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A circuit board assembly comprising:

a circuit board having a mounting surface, the circuit board having a mating edge;

an electrical connector having a connector housing holding contacts in a contact array, the connector housing having a mating end and a cable end, the mating end configured to be mated with a mating electrical connector in a mating direction, the electrical connector having cables terminated to the contacts and extending from the cable end, the connector housing having a mounting feature including an opening; and a connector mount for locating the electrical connector relative to the circuit board, the connector mount having a bracket coupled to the mounting surface of the circuit board proximate to the mating edge, the electrical connector being movably coupled to the connector mount to move relative to the circuit board during mating with the mating electrical connector, the connector mount having a biasing member coupled to the bracket and coupled to the mounting feature of the electrical connector, the biasing member being compressible along a compression axis parallel to the mating direction to allow the electrical connector to float in the mating direction relative to the circuit board, wherein the electrical connector is movably coupled to the connector mount in a confined envelope in at least one floating direction perpendicular to the mating direction;

wherein the biasing member includes a spring member and a spring pin extending along the compression axis, the spring member being compressible in the mating direction, the spring member surrounding the spring pin, the spring member being coupled to at least one of the connector housing and the bracket, the spring pin passing through the opening in the mounting feature, the spring pin passing through a bracket opening in the bracket, the bracket opening being oversized relative to the spring pin to allow the spring pin to move relative to the bracket, wherein a clearance gap is provided in the bracket opening between the bracket and the spring pin, the spring pin moving with the connector housing in the floating direction, a size of the clearance gap changing as the connector housing moves in the floating direction.

2. The circuit board assembly of claim 1, wherein the connector housing includes a front and a rear, the connector housing including a first side and a second side, the connector housing including a top and a bottom, the bottom of the connector housing facing the circuit board, the mating end at the front, the connector housing moving front-to-rear when floating in the mating direction.

3. The circuit board assembly of claim 2, wherein the confined envelope controls the floating movement in the floating direction in at least one of a side-to-side direction and a top-to-bottom direction.

4. The circuit board assembly of claim 2, wherein the confined envelope controls the floating movement in the floating direction in both a side-to-side direction and a top-to-bottom direction.

5. The circuit board assembly of claim 1, wherein the bracket includes a mounting plate mounted to the circuit board and a mounting tab extending from the mounting plate, the biasing member coupling the mounting feature to the mounting tab, the connector housing movable parallel to the mounting plate when moved in the mating direction, the connector housing movable parallel to the mounting tab when moved in the floating direction.

6. The circuit board assembly of claim 1, wherein a clearance gap is provided between the connector housing and the connector mount, a size of the clearance gap changing as the connector housing moves in the floating direction.

7. The circuit board assembly of claim 1, wherein the connector housing is slidable along the spring pin as the connector housing moves in the mating direction.

8. The circuit board assembly of claim 1, wherein the opening in the mounting feature is oversized relative to the spring pin to allow the connector housing to move in the floating direction relative to the spring pin.

9. The circuit board assembly of claim 8, wherein the opening is cylindrical allowing movement in at least two mutually perpendicular directions.

10. The circuit board assembly of claim 8, wherein the opening is oval-shaped allowing floating movement in one direction more than another direction.

11. The circuit board assembly of claim 8, wherein a clearance gap is provided in the opening between the mounting feature and the spring pin, a size of the clearance gap changing as the connector housing moves in the floating direction.

12. The circuit board assembly of claim 1, wherein the spring pin is threaded, a securing nut being threadably coupled to the spring pin, the spring member located between the securing nut and the mounting feature of the connector housing.

13. A communication system comprising:

a first circuit board assembly including a first circuit board, a first connector mount coupled to the first circuit board, and a first electrical connector coupled to the first connector mount, the first electrical connector having a first connector housing holding first contacts in a contact array, the first connector housing having a mating end and a cable end, the first electrical connector having cables terminated to the first contacts and extending from the cable end, the first connector housing having a first mounting feature, the first connector mount having a first bracket coupled to a mounting surface of the first circuit board proximate to a mating edge, the first electrical connector being movably coupled to the first connector mount to move relative to the first circuit board in a mating direction, the first connector mount having a first biasing member coupled to the first bracket and coupled to the first mounting feature of the first electrical connector, the first biasing member being compressible along a compression axis parallel to the mating direction to allow the first electrical connector to float in the mating direction relative to the first circuit board, wherein the first electrical connector is movably coupled to the first connector mount in a confined envelope in at least one floating direction perpendicular to the mating direction, wherein the first biasing member includes a spring member and a spring pin extending along the compression axis, the spring member being compressible in the mating direction, the spring member surrounding the spring pin, the spring member being coupled to at least one of the first connector housing and the first bracket, the spring pin passing through an opening in the first mounting feature, the spring pin passing through a bracket opening in the first bracket, the bracket opening being oversized relative to the spring pin to allow the spring pin to move relative to the first bracket, wherein a clearance gap is provided in the bracket opening between the first bracket and the spring pin, the spring pin moving with the first connector housing in the floating direction, a size of the clearance gap changing as the first connector housing moves in the floating direction; and a second circuit board assembly including a second circuit board and a second electrical connector coupled to the second circuit board, the second electrical connector having a second connector housing holding second contacts in a contact array, the second connector housing having a mating end coupled to the mating end of the first connector housing along a mating axis parallel to the mating direction.

14. The communication system of claim 13, wherein the first connector housing includes a front and a rear, the first connector housing including a first side and a second side, the first connector housing including a top and a bottom, the bottom of the first connector housing facing the first circuit board, the mating end provided at the front, the first connector housing moving front-to-rear when floating in the mating direction, the confined envelope controlling the floating movement in the floating direction in at least one of a side-to-side direction and a top-to-bottom direction.

15. The communication system of claim 13, wherein the first bracket includes a mounting plate mounted to the first circuit board and a mounting tab extending from the mounting plate, the first biasing member coupling the first mounting feature to the mounting tab, the first connector housing movable parallel to the mounting plate when moved in the mating direction, the first connector housing movable parallel to the mounting tab when moved in the floating direction.

16. The communication system of claim 13, wherein a clearance gap is provided between the first connector housing and the first connector mount, a size of the clearance gap changing as the first connector housing moves in the floating direction.

17. The communication system of claim 13, wherein the first biasing member includes a spring member and a spring pin extending along the compression axis, the spring member being compressible in the mating direction, the spring member surrounding the spring pin, the spring member being coupled to at least one of the first connector housing and the first bracket, the spring pin passing through an opening in the first mounting feature of the first connector housing, the first connector housing being slidable along the spring pin as the first connector housing moves in the mating direction, the opening in the first mounting feature being oversized relative to the spring pin to allow the first connector housing to move in the floating direction relative to the spring pin.

18. The communication system of claim 13, wherein the first biasing member includes a spring member and a spring pin extending along the compression axis, the spring member being compressible in the mating direction, the spring member surrounding the spring pin, the spring member being coupled to at least one of the first connector housing and the first bracket, the spring pin extending from the first connector housing and movable with the first connector housing, the spring pin passing through a bracket opening in the first bracket, the bracket opening being oversized relative to the spring pin to allow the first connector housing and the spring pin to move in the floating direction relative to the bracket.

19. The communication system of claim 13, wherein the second circuit board assembly includes a second connector mount coupled to the second circuit board, the second electrical connector coupled to the second connector mount, the second electrical connector having cables terminated to the second contacts, the second connector mount having a second bracket coupled to a mounting surface of the second circuit board proximate to the mating edge, the second electrical connector being movably coupled to the second connector mount to move relative to the second circuit board in a mating direction when mating with the first electrical connector, the second connector mount having a second biasing member coupled to the second bracket and coupled to the second electrical connector, the second biasing member being compressible along a compression axis parallel to the mating direction to allow the second electrical connector to float in the mating direction relative to the second circuit board.

20. The communication system of claim 19, wherein the second electrical connector is movably coupled to the second connector mount in a confined envelope in at least one floating direction perpendicular to the mating direction.

21. A communication system comprising:

a first circuit board assembly including a first circuit board, a first connector mount coupled to the first circuit board, and a first electrical connector coupled to the first connector mount, the first electrical connector having a first connector housing holding first contacts in a contact array, the first connector housing having a mating end and a cable end, the first electrical connector having cables terminated to the first contacts and extending from the cable end, the first connector housing having a first mounting feature, the first connector mount having a first bracket coupled to a mounting surface of the first circuit board proximate to a mating edge, the first electrical connector being movably coupled to the first connector mount to move relative to the first circuit board in a mating direction, the first connector mount having a first biasing member coupled to the first bracket and coupled to the first mounting feature of the first electrical connector, the first biasing member being compressible along a compression axis parallel to the mating direction to allow the first electrical connector to float in the mating direction relative to the first circuit board, wherein the first electrical connector is movably coupled to the first connector mount in a confined envelope in at least one floating direction perpendicular to the mating direction; and a second circuit board assembly including a second circuit board and a second electrical connector coupled to the second circuit board, the second electrical connector having a second connector housing holding second contacts in a contact array, the second connector housing having a mating end coupled to the mating end of the first connector housing along a mating axis parallel to the mating direction, wherein the second circuit board assembly includes a second connector mount coupled to the second circuit board, the second electrical connector coupled to the second connector mount, the second electrical connector having cables terminated to the second contacts, the second connector mount having a second bracket coupled to a mounting surface of the second circuit board proximate to the mating edge, the second electrical connector being movably coupled to the second connector mount to move relative to the second circuit board in a mating direction when mating with the first electrical connector, the second connector mount having a second biasing member coupled to the second bracket and coupled to the second electrical connector, the second biasing member being compressible along a compression axis parallel to the mating direction to allow the second electrical connector to float in the mating direction relative to the second circuit board.

22. The communication system of claim 21, wherein the second electrical connector is movably coupled to the second connector mount in a confined envelope in at least one floating direction perpendicular to the mating direction.

23. The communication system of claim 21, wherein the first biasing member includes a spring member and a spring pin extending along the compression axis, the spring member surrounding the spring pin, the spring member being coupled to at least one of the first connector housing and the first bracket, the spring pin passing through an opening in the first mounting feature, the spring pin passing through a bracket opening in the first bracket, the bracket opening being oversized relative to the spring pin to allow the spring pin to move relative to the first bracket, wherein a clearance gap is provided in the bracket opening between the first bracket and the spring pin, the spring pin moving with the first connector housing in the floating direction, a size of the clearance gap changing as the first connector housing moves in the floating direction.

* * * * *